Nov. 11, 1952 — W. F. SINDELAR — 2,617,278
CONSTANT VELOCITY UNIVERSAL JOINT
Filed July 10, 1947 — 4 Sheets-Sheet 1

INVENTOR.
WILLIAM F. SINDELAR
BY
Kwis, Hudson, Boughton & Williams
ATTORNEYS

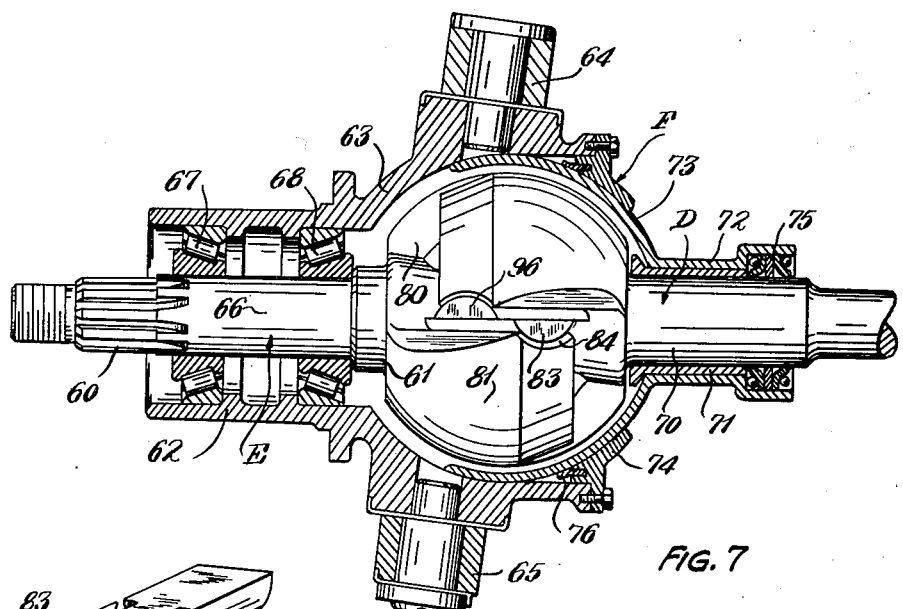
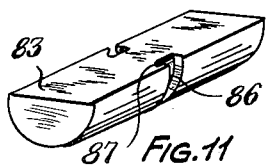
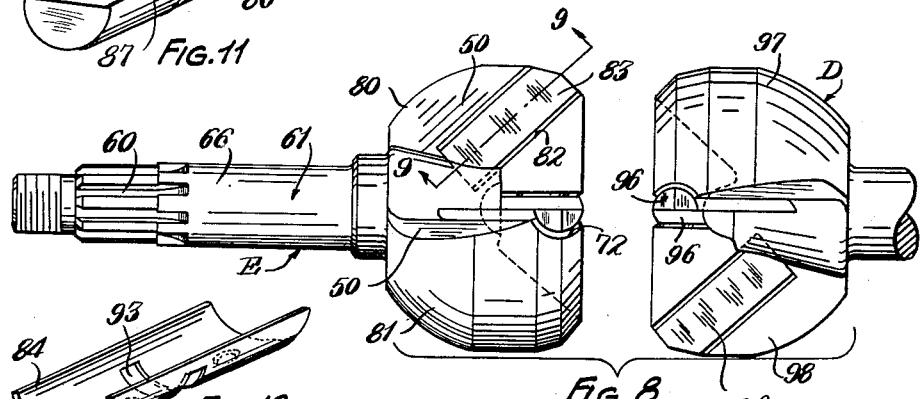
INVENTOR.
WILLIAM F. SINDELAR
BY
Kwis, Hudson, Boughton & Williams
ATTORNEYS Nov. 11, 1952 W. F. SINDELAR 2,617,278
CONSTANT VELOCITY UNIVERSAL JOINT
Filed July 10, 1947 4 Sheets-Sheet 3

INVENTOR.
WILLIAM F. SINDELAR
BY
Kwis, Hudson, Boughton & Williams
ATTORNEYS

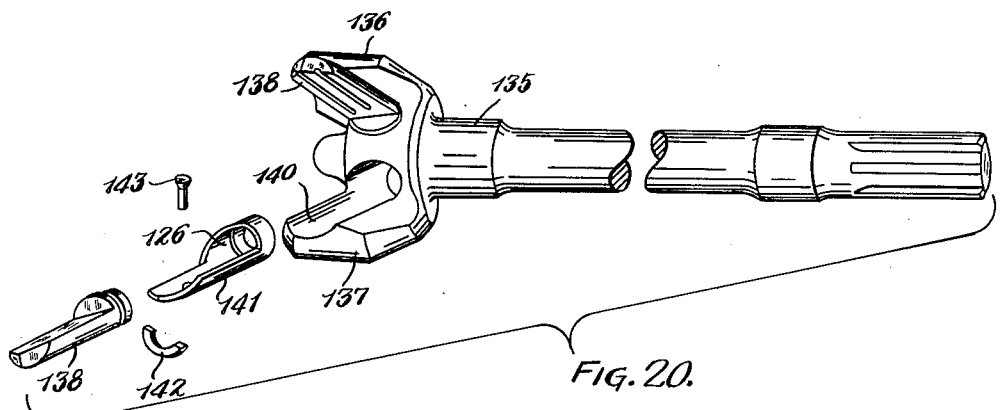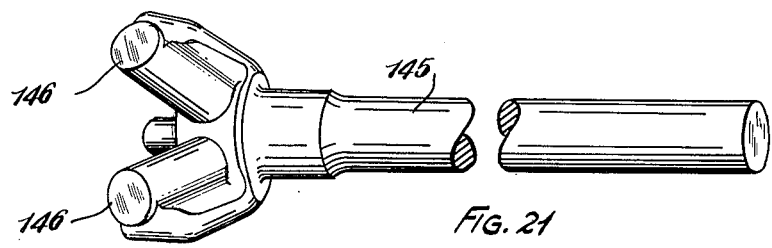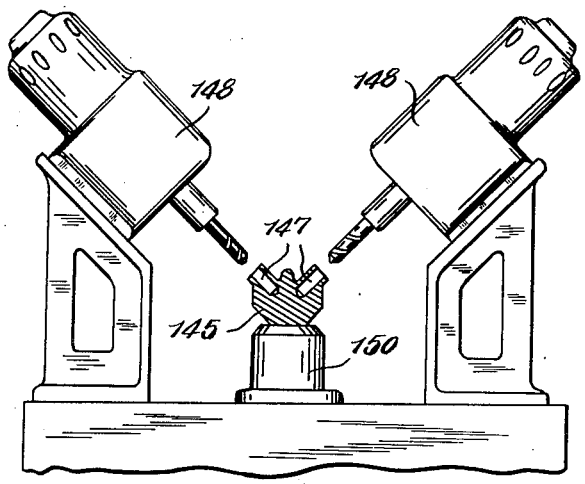

Patented Nov. 11, 1952

2,617,278

UNITED STATES PATENT OFFICE 2,617,278

CONSTANT VELOCITY UNIVERSAL JOINT

William F. Sindelar, Cleveland, Ohio

Application July 10, 1947, Serial No. 760,014

6 Claims. (Cl. 64—21)

The present invention relates to constant velocity, universal joints for motion transmission mechanisms and particularly to constant velocity, universal joints for use in automobiles.

This application is a continuation in part of my copending application Serial No. 608,989, filed August 4, 1945.

One of the principal objects of the invention is the provision of a novel and improved universal joint, the relative angular velocity of the driving and driven members of which is constant for different angles of deflection therebetween.

Other objects of the invention are the provision of a novel and improved universal joint of the character referred to which is small, compact, simple and rugged in construction, can be enclosed or sealed for retaining lubrication and is otherwise particularly adapted for use in automobile drives and especially a front or steering wheel drive.

A further object of the invention is the provision of a novel and improved universal joint of the character referred to, the driving and driven members or assemblies of which are supported for substantial but limited angular movement about the intersection of their respective axes of rotation, are substantially alike and each comprises elongated more or less semi-cylindrical shaped contact members rotatably supported about axes equally spaced from the intersection of the axes of rotation of the driving and driven assemblies and lying in the planes of their respective flat surfaces and forming fixed, acute angles with the axis of rotation of the driving or driven assemblies of which they are a part, and which contact members have their flat surfaces in sliding engagement with similar surfaces on the corresponding parts of the other assembly.

A further object of the invention is the provision of a novel and improved universal joint of the character referred to, the respective driving and driven parts of which are unit assemblies, thus facilitating assembly and maintenance of the joint.

A still further object of the invention is the provision of a novel and improved method of manufacturing a universal joint of the character referred to.

The invention resides in certain constructions and combinations and arrangements of parts and further objects and advantages will be apparent from the following description of a number of preferred embodiments described with reference to the accompanying drawings forming a part of the specification in which similar reference characters designate corresponding parts, and in which Fig. 1 is a side elevational view, with portions broken away and in section, of a universal joint embodying the present invention;

Fig. 7 is a side elevational view, with portions broken away and in section, of a universal joint of different construction from that shown in Figs. 1 to 6, but embodying the present invention;

Fig. 8 is a side elevational, exploded view of portions of the universal joint shown in Fig. 7;

Fig. 9 is a sectional view, approximately on the line 9—9 of Fig. 8;

Fig. 10 is a sectional view, approximately on the line 10—10 of Fig. 9;

Fig. 11 is a perspective view of one of the semi-cylindrical, contact or driving members shown in Figs. 7 to 10;

Fig. 12 is a perspective view of one of the bearing members shown in Figs. 7 to 10;

Fig. 13 is a perspective view of one of the key members employed in the joint;

Fig. 14 is a perspective view of one of the locking members employed with the key members;

Fig. 15 is a perspective view of the spring member employed with the key and locking members;

Fig. 20 is an exploded view of one-half of a universal joint embodying the present invention and comprising semi-cylindrical driving members similar to those shown in Figs. 16 to 19;

Fig. 21 is a perspective view of a forging similar to that used in the manufacture of the Y-member shown in Fig. 20 and, in part, illustrates the preferred method of manufacturing the Y-members; and Fig. 22 is an elevational view, with portions in section, of a multiple drilling machine and further illustrates the preferred method of manufacturing the Y-members.

Figure 1:
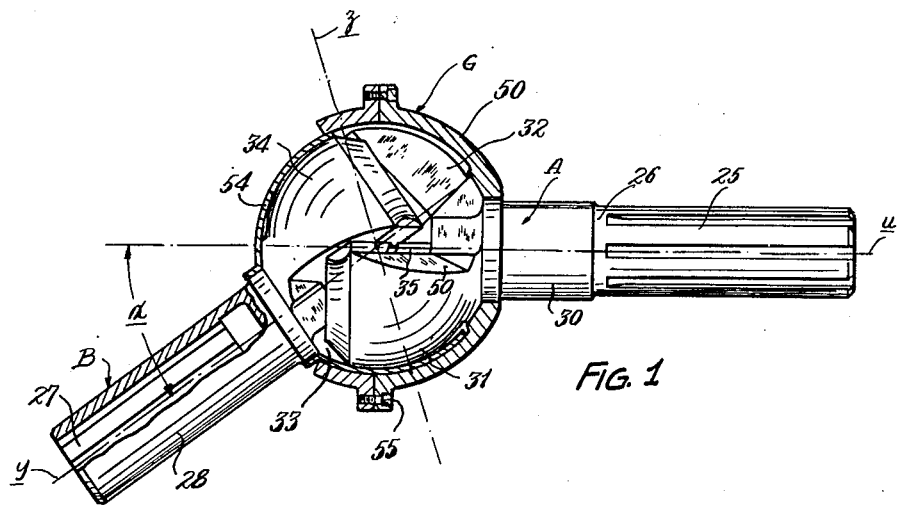

Referring to Figs. 1 to 6 of the drawings, the universal joint shown therein comprises two assemblies A and B, either of which may be the driven assembly or member. The assemblies are pivotally connected together for substantial but limited universal angular movement relative to each other about the intersection of their axes of rotation by a ball and socket type housing C which encloses the joint proper. The assemblies A, B are identical in construction except for the means shown for connecting them in a power transmission system. As shown, the assembly A is designed to be the driving member of the joint and it is adapted to be connected in a power transmission system by an externally splined portion 25 on a Y-member 26 forming a part of the assembly. The assembly B is adapted to be connected in the transmission system by an internally splined portion 27 of a Y-member 28 forming a part of assembly B. Insofar as the present invention is concerned, the particular way in which the universal joint is connected in the power transmission system is immaterial and any suitable method may be employed. Two alternative constructions are shown in the embodiments hereinafter described.

In the embodiment shown in Fig. 1, provision is made for rotatably supporting the shank of the Y-member 26 in a suitable antifriction bearing, not shown, but connected to the cylindrical section 30 intermediate the splined portion 25 and the head formed by the projecting driving arms or members 31, 32, hereinafter specifically referred to. The assembly B is supported from assembly A by the contact between the contact members of the driving arms or members 31, 32 of assembly A and the contact members of the driven arms or members 33, 34 of assembly B and by the enclosing ball and socket joint C; however, the ball and socket joint is not essential to the operation of the joint if the left-hand end of the Y-member 28 is connected to a member supported for limited, angular and axial movement relative to the axis of assembly A. Since both of the Y-members 26, 28 are identical, except for the differences mentioned, only the member 26 is herein shown and described in detail.

In addition to the shank portion comprising the parts 25, 30, the Y-member 26 comprises the two transversely projecting, driving members or arms 31, 32 located 180° with respect to each other and formed integral with the shank portion thereof. The members 31, 32 are each substantially half quadrants of a thick-walled, hollow sphere and have semi-cylindrical, pin-like contact members 35, 36 and 37, 38, respectively, at opposite sides thereof and supported thereby for rotation relative thereto about axes $s$ making equal fixed acute angles $t$ of preferably about 25° to 50° with the axis of rotation $u$ of the driven member 26. As shown, the contact members 35 to 38 are rotatably supported in suitable grooves 41 to 44, respectively, segment-shaped in cross-section and formed in the side faces of the half quadrant-like projections or arms 31, 32, with the axes $s$ of rotation of the members 35, 36 and 36, 37 lying in planes at right angles to each other, as clearly shown in Figs. 3 and 4. The longitudinal axes of the grooves 41 to 44 coincide with the axes of rotation $s$ of the members 35 to 38, respectively.

The contact members may be retained in assembled relationship with their respective driving arms in any suitable manner. As shown, the radially inner ends of the semi-cylindrical contact members are provided with shank portions 45 rotatably supported in suitable apertures 46 in the member 26 at the inner ends of the segment-shaped grooves and coaxial therewith. The contact members are retained against longitudinal movement in their respective grooves by balls 47 positioned in suitable, substantially semi-spherical apertures in the bottom of the grooves and midway between their ends. Portions of the balls project into circumferential grooves 48 in the cylindrical surfaces of the semi-cylindrical contact members approximately midway between their ends. The contact members are assembled in their respective grooves by first positioning the ball 47 in the aperture provided therefor in the groove into which a contact member is to be assembled; thereafter, the projection 45 of the contact member is inserted into the aperture 46 at the inner end of the groove while the member is held with its flat surface facing the groove. When the circumferential groove 48 in the contact member is opposite the ball 47, the contact member is rotated about its axis $s$ into approximately its desired final position. The parts can be disassembled by reversing the operation, but for all practical purposes, the assembly is a unit and the semi-cylindrical contact members are normally retained in position which facilitates handling and assembling of the joint. Other suitable means may be employed for retaining the contact members assembled with their respective Y-members. Two alternative constructions are shown in the drawings and will be hereinafter specifically referred to.

The radial sides of the driving portions or arms 31, 32 of the member 26 are cut away outwardly of the semi-cylindrical contact members, as indicated by the reference character 50 and the angle $v$, to provide clearance for the contact members of the cooperating assembly when the driving and driven parts of the joint are assembled with each other and flexed relative to each other. The radial sides of the driving arms inwardly of the contact members are relieved or cut away in a similar manner, as indicated at 51 and the angle $w$. Since both assemblies A and B are alike in this respect, the driven arms 33, 34 of assembly B are relieved or cut away in a similar manner.

Figure 6:
Fig. 6 is a fragmentary sectional view approximately on the line 6—6 of Fig. 2.
Figure 5:
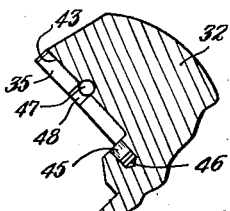
Fig. 5 is a fragmentary sectional view, with portions in elevation, approximately on the line 5—5 of Fig. 2.
Figures 2, 3:
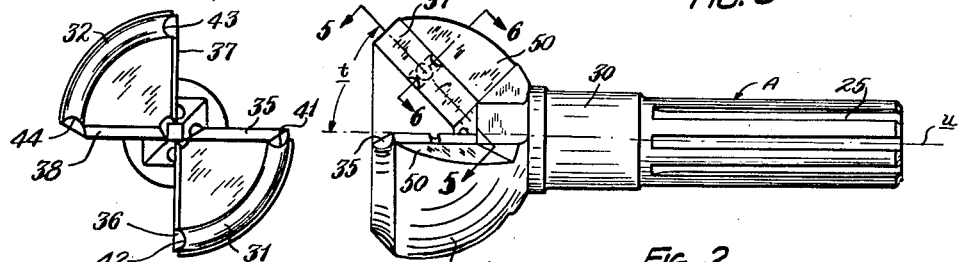
Fig. 2 is an elevational view of a portion of the universal joint shown in Fig. 1.
Fig. 3 is an end view of Fig. 2, looking from the left.
Figure 4:
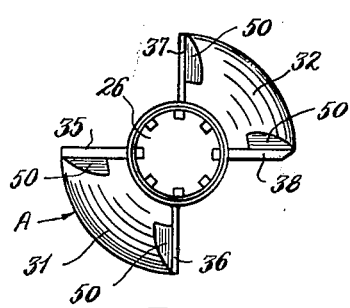
Fig. 4 is an end view of Fig. 2, looking from the right.
Figure 16:
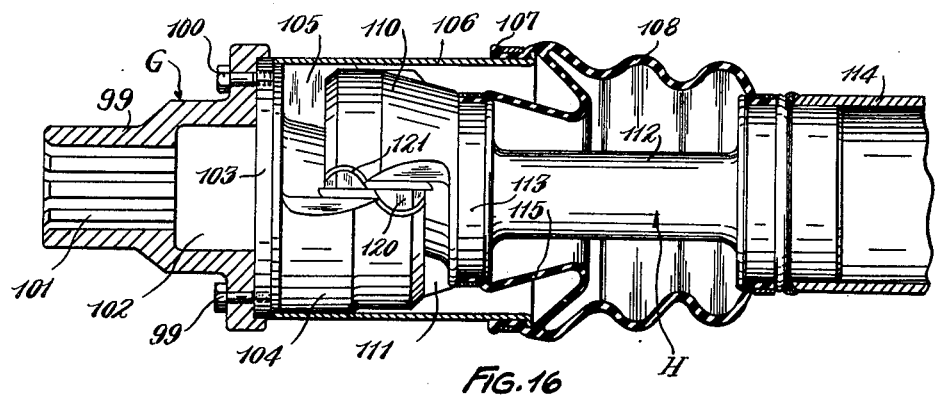
Fig. 16 is a side elevational view, with portions broken away and in section, of a universal joint of still different construction but embodying the present invention.
Figure 17:
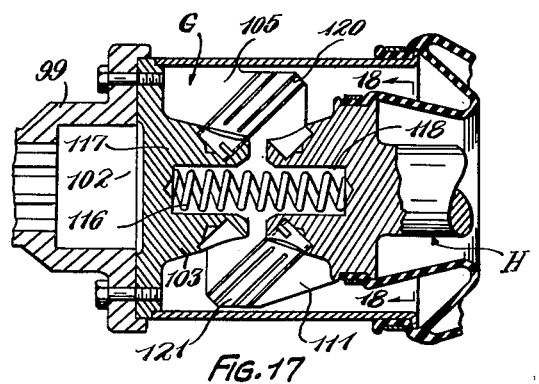
Fig. 17 is a fragmentary sectional view through the universal joint shown in Fig. 16 taken in the plane of the paper.
Figure 18:
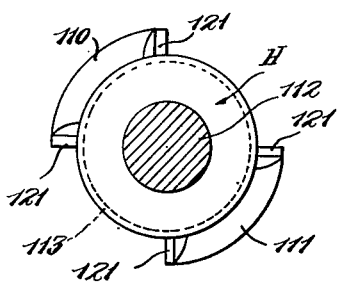
Fig. 18 is a sectional view of the driven assembly only, approximately on the line 18—18 of Fig. 17.
Figure 19:
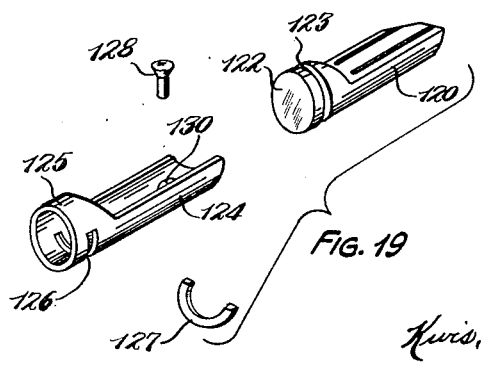
Fig. 19 is an exploded view showing the manner of retaining the semi-cylindrical, contact or driving members assembled with their respective supporting arms.

The angles $v$, $w$, which are both preferably about 5° to 30°, see Fig. 6, depending upon the maximum deflection angle $x$ for which the universal joint is designed, can be increased or decreased from that shown, as desired. The transverse, cross-sectional shape of the grooves in which the contact members are supported is approximately that of a 100° to 170° segment of a circle, from which it follows that each of the semi-cylindrical contact members can rock through an angle of from about 10° to 80°. The joint of the present invention is intended to operate for deflection angles $x$ between the respective assemblies of about 45° or less. If the driving and driven assemblies are flexed more than a predetermined angle for any given construction, the normally engaged contact members will disengage for a fraction of each revolution, thus concentrating the load on a limited number of members, with the result that the joint may fail. If the joint did not otherwise fail, the contact members would, in all probability, not be in position for their flat surfaces to re-engage at the proper time. Where deflection angles are referred to herein, including the claims, an appreciable or substantial maximum angle is meant but not one exceeding approximately 45°.

The permissible maximum deflection angle $x$ depends, to a limited extent, upon the angle $t$ formed by the axis $s$ of rotation of the contact members and the axis of rotation of the respective driving and driven assembly of which they are a part. As the angle $t$ between the axes $s$ of the contact members and the axes of rotation of their respective assemblies is increased, the maximum deflection angle obtainable decreases because the deflection angle must be limited to one where the cooperating contact members are engaged with each other at all times.

The angle through which the contact members rotate about their axes $s$, with respect to their supporting arms, is a function of the angle $t$ and should be as small as consistent with other requirements so as to minimize wear.

For any given deflection angle $x$ and any given angle $t$, the angle $v$ at any point in the rotation of the joint can be determined from the following equations:

$$\mathrm{Tan}\ v = \frac{\sin r\ (\sin x + \tan t \cos r\ (1 - \cos x))}{\sin x \cos r\ (\tan t \sin t - \cos t) + \sin t\ (2 \cos x + \sin^2 r\ (1 - \cos x))}$$

$$\mathrm{Tan}\ v' = \frac{\sin r\ (\sin x - \tan t \cos r\ (1 - \cos x))}{\sin x \cos r\ (\cos t - \tan t \sin t) + \sin t\ (2 \cos x + \sin^2 r\ (1 - \cos x))}$$

where $v$ = the angle of the contact members where they are within the acute angle of the deflected joint defined by planes through the axis of rotation of the driving and driven assemblies and normal to the plane of said axes $v'$ = the angle of the contact members where they are without the acute angle of the deflected joint defined by planes through the axis of rotation of the driving and driven assemblies and normal to the plane of said axes $r$ = angle between the axis $s$ and the plane of the axis of rotation of the respective assemblies.

The bearing areas for the contact members are relatively large even though the faces of the driving and driven arms are relieved at opposite sides of the contact members because the construction is such that the contact members are supported by the arms throughout their entire length.

In a universal joint similar to that disclosed in Fig. 1, important limiting factors are the overall size of the joint and the strength requirement at the place where the driving and driven arms are connected to their respective shank portions. As the angle $t$ between the axes $s$ of the contact members and the axis of rotation of their respective assemblies is increased, the angle through which the contact members must pivot varies and the strength at the place where the driving and driven arms are connected to the shank portions of the Y-members increases. The angle $t$ which the axes $s$ of the contact members make with the axes of rotation of their respective assemblies is preferably 35° to 45° for a universal joint intended to be used in a steering wheel drive of an automobile as this angle gives sufficient deflection between the driving and driven members for practical purposes, minimum pivotal movement of the contact members about their axes $s$ so as to minimize the wear therebetween and their supporting surfaces, and maximum strength for a given overall size. In the event the joint is intended only for use as a substitute for the conventional universal joint now used in passenger automobiles at the transmission or forward end of the drive to the rear axle, the angle of deflection requirements would be less; however, the angle $t$ is preferably one which gives minimum rotation between the contact members and their respective supporting surfaces.

When the two assemblies A, B are in operating position, the driving connection is effected through the plane-contacting surfaces of the semi-cylindrical contact members and the intersections of the longitudinal axes $s$ of the various pairs of contact members are equally spaced from the intersection $p$ of the axes of rotation $u$, $y$ of the assemblies A, B, respectively, and always lie in a plane $z$ bisecting the angle between the axes of rotation of the assemblies, thus fulfilling the requirements for constant velocity transmission. The engaging surfaces between any pair of cooperating contact members always lie in a plane formed by the intersection of the longitudinal axes of the members upon which they are located and a line connecting the points of intersections of their longitudinal axes with the axes of rotation of the respective assemblies of which they form a part. This plane is always perpendicular to the plane bisecting the angle between the axes of the assemblies no matter what angular position the contact members assume, and revolves about an imaginary axis through the points of intersections of the longitudinal axes of the semi-cylindrical members with the axes of rotation of the assemblies.

As previously stated, and as will appear from the foregoing description and the drawings, the arms or drive members 31, 32 are shaped more or less like half quadrants of a thick-walled, hollow sphere, or, in other words, quadrants of a thick-walled, hollow, semi-sphere. Another way of describing them is to say that they have the general shape of an isosceles spherical triangle pyramid (a spherical pyramid having an isosceles spherical triangle for its base) formed from a thick-walled, hollow sphere and connected at its apex to the end of the rotatable shank or supporting member. The fact that the sphere is hollow results in the trihedral angle being cut away and produces an undercut in the free or projecting end of the drive member. The construction provides a hollow or relieved portion in the nature of a recess or aperture on the interior of the free or projecting ends of the arms or drive members into which the boss or shank portion immediately adjacent to the place where the arms or drive members are connected to the shank or supporting member proper of the cooperating unit may be received as the joint flexes in operation. Attention is also called to the fact that the free or projecting ends of the driving arms or members are spaced longitudinally of the cooperating assembly a distance equal to not less than about one quarter their length when the axes of the assemblies are aligned, as is clearly shown in Fig. 7, so that the joint may flex through the desired angle without the free ends of the drive members striking the other assembly.

While the contact members shown are semi-cylindrical, pin-like members, it will be apparent that members of any suitable shape may be employed so long as the above-specified requirements for constant velocity transmissions are fulfilled; for example, the contact members may be semi-spherical in shape, etc. It is also to be understood that any desired number of pairs of contact members may be employed.

In the embodiment referred to, the assemblies A, B are normally retained in assembled position for angular movement about the intersections of their axes of rotation by the ball and socket type housing C. The housing shown comprises a two-part, external, socket-like member 53 connected to the member 26 and an internal, ball-like member 54 connected to the member 28. The external member 53 is comparatively rigid, as is the internal member 54, and the external member is made in two parts so as to permit assembly and disassembly of the universal joint. The two parts of the external socket member 53 may be detachably secured together in any suitable manner, as by the screws 55. The housings 53, 54 not only help to retain the members 26, 28 in assembled relation and in desired end-to-end spaced relation but form a lubricant-retaining enclosure for the operating parts of the universal joint. If desired, the members 26, 28 may be unenclosed or other means may be employed either as a substitute for the housing shown or as a supplement thereto.

Figs. 7 to 15 show a constant velocity, universal joint very similar to the joint shown in Figs. 1 to 6, inclusive. The two joints differ primarily in certain details of construction, such as, the manner of supporting and enclosing the joint proper and the way in which the semi-cylindrical, contacting or driving members are held in assembled relation with the respective driving and driven Y-shaped members. The assemblies D, E, corresponding with the assemblies A, B, respectively, previously referred to, are alike except for the enclosing housing and the manner in which they are supported and connected in the transmission system.

The particular construction shown in Fig. 7 is designed for incorporation in a front or steering wheel drive of an automobile and the driven assembly E is adapted to be directly connected through the medium of a splined section 60 on the shank of the Y-member 61 to the front wheel of an automobile rotatably supported by the sleeve portion 62 of the two-piece socket housing 63 of the ball and socket joint F corresponding with the ball and socket joint C of the previous embodiment. The members 64, 65 are a part of the king-pin construction and form no part of the present invention. The shank or cylindrical portion 66 of the Y-member 61 is rotatably supported in the sleeve part 62 of the housing 63 to which the king-pin is connected by antifriction bearings 67, 68. The driving assembly D, which includes the Y-member 70, is rotatably supported by means of a bushing 71 in a sleeve portion 72 formed integral with the ball portion 73 of the ball and socket connection F. The socket housing 63, as previously stated, is made in two parts and includes the annular member 74 detachably secured to the socket proper for permitting assembly and disassembly of the joint. An oil seal 75 located in the right-hand end of the sleeve 72 and surrounding the portion of the Y-member 70 prevents the escape of lubricant from the right-hand end of the ball and socket joint. The member 74 is also provided with an oil seal 76.

The projecting arms or quadrants 80, 81 of the Y-member 61 are formed integral with the shank portion 66 thereof and opposite radial faces are provided with grooves 82 corresponding to the grooves 40 to 44, previously referred to, within which grooves 82 semi-cylindrical contact members 83 are pivotally supported. As distinguished from the construction shown in Figs. 1 to 6, in the present instance, suitable channel or trough-shaped bearing members 84 are interposed in the grooves 82 underneath the semi-cylindrical contact members 83, which bearing members may be readily replaced in the event of wear, etc. The bearing members 84 are secured in their respective grooves 82 by screws 85 threaded into suitably tapped apertures opening into the bottom of the grooves. The heads of the screws 85 are countersunk so as not to interfere with the pivotal movement of the contact members 83. Each of the members 83 is provided with a circumferential groove 86 approximately midway between its ends and undercut on one side, as indicated at 87 to receive an inclined flange 88 on the upper reduced end of a key member 90 which holds the contact member assembled with the Y-member while permitting pivotal movement abouts its longitudinal axis s. The inner portion of the key member 90 is provided with a transversely extending flange 91 and extends into an arcuately-shaped groove 92 in the bottom of the groove 82. The upper end of the key member 90 projects through a suitable slit 93 in the bearing or bushing 84. The key member 90 is comparatively narrow and is maintained in position by a locking member 94 having outwardly projecting arms at its upper end positioned in the groove 86 and overlying portions of the member 84 adjacent to the groove 93. The upper surface of the member 94 conforms to the bottom surface of the groove 86 and the width of the member is such as to prevent removal of the key member 90 when the upper part of the member 94 is positioned in the groove 86 beside the upper end of the key member 90.

The lower end of the member 94, which is narrower than the part thereof which lies in the groove 86 and is approximately as wide as the groove 93 is long, projects toward the flange 91 on the member 90 and assists in retaining a spring member 95 in position therebetween and the upper side of the flange 91. The spring member 95 includes side portions or arms which are flared outwardly in a manner to engage the undersides of the bearing member 84 adjacent to opposite ends of the slit 93. The construction is such that the spring member 95 by the engagement of the free ends of its outwardly and upwardly projecting arms with the bearing member 84 prevents outward movement of the member 90 and, in turn, maintains the semi-cylindrical contact member 83 with which it is associated assembled with the bearing member 84. The co-operating contact members, designated 96, of the driving assembly D are retained in the arms 97, 98 thereof in a similar manner.

In assembling the units, the bearing members 84, the key members 90, the locking members 94, and the spring members 95 are assembled in position in their respective grooves 82 and thereafter the semi-cylindrical contact members are assembled therewith by inserting the assembled members 90, 94 into one end of the grooves 86, and rotating the contact members about their axes s until the plane surfaces thereof lie in or substantially in radial planes through the axis of rotation of the Y-member to which they are attached. The parts can be readily disassembled by reversing the operation but, for all practical purposes, the Y-members and their assembled semi-cylindrical contact members are units and can be handled as such, which facilitates manufacture and maintenance of the device.

One of the advantages of the constant velocity, universal joint of the present invention is the fact that the driving and driven assemblies or parts thereof need not be supported for pivotal movement about a fixed point but the point about which the assemblies flex, or, in other words, the intersections of the axes of rotation of the respective assemblies may be varied during operation. The only change involved from that shown in Figs. 1 to 15 is a change in the enclosing housing which, in the figures mentioned, is in the form of a ball and socket joint. This feature makes the joint particularly applicable to conventional automobile drives which usually employ a universal joint in the drive to the rear axle, which joint is immediately behind the speed change transmission, because with the present joint the conventional spline connection in the drive can be omitted.

Figs. 16 to 19, inclusive, show a universal joint similar in construction to the two joints previously described, except that the driving and driven assemblies proper G, H, corresponding with the assemblies A, B and D, E, previously referred to, are supported in such a manner that they may move axially toward or from each other a limited amount in addition to their normal pivotal movement. In the embodiment shown, the assembly, designated G, is intended to be the driving assembly and is normally supported against axial movement. The assembly H is supported from the assembly A and is movable axially toward and from assembly G in addition to being angularly movable relative thereto. The assemblies are slightly different in form from those previously referred to but the principle of operation is the same.

As shown, assembly G comprises a two-piece Y-member 99, the parts of which are fixedly secured together in any suitable manner, as by screws 100. The member is made in two parts to facilitate manufacture. An internally splined section 101 opening into a recess 102 of larger diameter is employed for connecting it in the transmission system. The separately formed part 103 includes the driving arms 104, 105 corresponding with the quadrants 31, 32 of the embodiment shown in Figs. 1 to 6. In the present instance, the two assemblies are not enclosed within a ball and socket connection, therefore, the outside shape of the driving arms need not be spherical and, in fact, are more or less cylindrical and form a support or connection for a rigid, cylindrical, tubular housing member 106 enclosing the joint proper and to the free end of which an intermediate part 107 of a flexible boot 108 is connected. The driven assembly H is generally similar in construction to the driving assembly G except that the driven arms 110, 111 formed integral with the Y-member 112 are frusto-conical in shape to permit pivotal movement of the assembly within the sleeve 106 which normally encloses the arms thereof. The Y-member 112 of the driven assembly H is provided with a cylindrical groove 113 adjacent to the arms 110, 111 thereof, within which groove the left-hand end of the flexible boot 108 is detachably connected. The right-hand end of the member 112 is fixedly secured, as by welding, to a tubular shaft 114 and the right-hand end of the flexible boot 108 is secured to the member 112 adjacent the shaft 114. The member 112 is of reduced diameter intermediate the places where the opposite ends of the flexible boot 108 are secured thereto but any other suitable construction may be employed; for example, the tubular shaft 114 can be connected to the member 112 immediately to the right of the driven arms or members and that part of the flexible boot 108 between the free end of the sleeve 106 and the shaft 114 omitted. The part 115 of the flexible boot 108 connecting the sleeve 106 to the member 112 adjacent the driven arms forms with the sleeve 106 an enclosure for the joint proper, excluding dirt and retaining lubricant but permitting movement of the driven assembly H toward and from the driving assembly G. If desired, the two assemblies may be continuously urged in a direction to separate the same by a compression spring 116, opposite ends of which are located in suitable apertures 117, 118 in the assemblies G, H, respectively.

In the embodiment shown in Figs. 16 to 19, the semi-cylindrical contact members are secured to their respective Y-members in a slightly different manner than that heretofore described. As shown, the semi-cylindrical members 120 of the driven assembly G and their corresponding members 121 of the driven assembly H comprise cylindrical portions 122 at their inner ends provided with circumferential grooves 123 and are supported in channel-shaped bearing members 124 having cylindrical, tubular sections 125 at one end within which the cylindrical part 122 of the contact member associated therewith fits. The bearing members 124 each has a semi-circumferential slot 126 in the cylindrical end 124 thereof and the contact member associated therewith is held in assembled relationship with the bearing member by a half washer-like member 127 adapted to fit into the slot 126 in the bearing member, with the radially inner half thereof in the groove 123 in the contact member. The assembled contact member, bearing member and half washer are assembled in their respective grooves in the Y-members, which grooves are provided with cylindrical apertures at their inner ends by inserting a rivet-like member 128 in a counterbored aperture 130 in the bottom of the channel part of the bearing member and an aligned aperture in the bottom of the groove in the driving or driven arm. The rivet-like member 139 is inserted with the contact member rotated 180° from its normal working position and when rotated about its axis s into a position to substantially fill the channel in the bearing member, the rivet member and, in turn, the other parts are securely held in place.

Fig. 20 shows one-half of a constant velocity, universal joint similar to the driven half H of the joint shown in Figs. 16 to 19, except for the particular shape of the Y-member and the manner in which it is adapted to be connected in a transmission system. The assembly shown comprises the Y-member 135, including arms 136, 137, provided with contact members 138 in the opposite radial faces of the arms or drive members 136, 137 similar to the contact members 120, previously referred to, and secured in grooves 140 similar to the grooves within which the members 120 are secured by bearing members 141, semiwashers 142, and rivets 143 similar to the bearing member, washer and rivet shown in Fig. 19.

The Y-members of the various assemblies of the joint of the present invention may be manufactured in various ways. Preferably they are machined from forgings to approximately their finished shape but with sufficient excess material at the places where the grooves for the contact members come to permit formation of the grooves by first drilling holes at the proper places and then machining the excess material away.

Fig. 21 shows a forging 145 which can be made into a Y-member like that shown in Fig. 20. The forging is provided with excess material 146 at the places where the grooves 140 are to be formed. The grooves are formed by drilling, preferably simultaneously, four holes 147 in the forging, the centers of which coincide with the desired axes s of rotation of the contact members 138 and the diameters of which are that of the external diameters of the cylindrical portions of the bearing members 141. The excess material is subsequently removed, as by milling. The relief 50, 51 of the radial faces, previously referred to, is preferably forged simultaneously with the forging of the other parts of the blank. Alternatively, it may be subsequently formed by milling.

A multiple drilling machine suitable for simultaneously drilling the four holes referred to is illustrated in Fig. 21. Only two of the four drill heads 148 required are shown, the other two will be located 90° from the two shown. The work may be held in any suitable chuck 150 and the drill heads moved toward and from the work in any conventional manner.

From the foregoing description of the preferred embodiments of the invention, it will be apparent that the objects heretofore enumerated and others have been accomplished and that there has been provided a novel and improved constant velocity, universal joint which is simple and rugged in construction and reliable in operation, together with a novel method of manufacturing the same. While the preferred embodiments have been described in considerable detail, the invention is not limited to the particular constructions and steps shown and it is my intention to cover hereby all adaptations, modifications and uses thereof which come within the practice of those skilled in the art to which the invention relates and within the scope of the appended claims.

Having thus described my invention, I claim:

1. A universal joint comprising rotatable assemblies supportable in driving relationship, said assemblies comprising shaft-like members having intermeshing power transmitting members projecting from adjacent ends thereof in fixed outwardly diverging acute angular relationship with reference to the axes of rotation of said respective assemblies of which they are a part, each of said power transmitting members having the general shape of an isosceles spherical triangle pyramid of a thick-walled hollow sphere connected at one vertex to said shaft-like member of the respective assemblies of which it is a part thereby providing clearance underneath their projecting ends to permit substantial angular movement of said assemblies relative to each other, cooperating pairs of contact members consisting of half bodies of revolution carried by said power transmitting members with their flat surfaces in continuous sliding engagement with each other, said contact members being oscillatably supported in recesses in said power transmitting members, said recesses facing toward each other and having the general shape of a segment of a body of revolution similar to that of the contact members but having an arc of not more than approximately 170°, and means detachably connecting said contact members to said respective assemblies of which they are a part.

2. A universal joint comprising rotatable assemblies supportable in driving relationship, said assemblies comprising shaft-like members having intermeshing power transmitting means projecting from adjacent ends thereof in fixed outwardly diverging acute angular relationship with reference to the axes of rotation of said respective assemblies of which they are a part, each of said power transmitting members having the general shape of an isosceles spherical triangle pyramid of a thick-walled hollow sphere connected at one vertex to said shaft-like member of the respective assemblies of which it is a part thereby providing clearance underneath their outer ends to permit substantial angular movement of said assemblies relative to each other, said power transmitting means comprising cooperating pairs of semi-cylindrical contact members having their flat surfaces in continuous sliding engagement with each other and oscillatably supported in fixed outwardly diverging angular relationship with respect to the axis of rotation of said respective assemblies of which they form a part at an angle in the order of 25° to 50°, and means detachably connecting said contact members to said respective assemblies of which they are a part.

3. A universal joint comprising rotatable assemblies supportable in driving relationship, said assemblies comprising shaft-like members having intermeshing power transmitting members projecting from adjacent ends thereof in fixed outwardly diverging acute angular relationship with reference to the axes of rotation of said respective assemblies of which they are a part, each of said power transmitting members having the general shape of an isosceles spherical triangle pyramid of a thick-walled hollow sphere connected at one vertex to said shaft-like member of the respective assemblies of which it is a part thereby providing clearance underneath their projecting ends to permit substantial angular movement of said assemblies relative to each other, cooperating pairs of semi-cylindrical contact members carried by said power transmitting members with their flat surfaces in continuous sliding engagement with each other and oscillatably supported in fixed outwardly diverging angular relationship with reference to the axis of rotation of said respective assemblies of which they form a part at an angle in the order of 25° to 50° by being positioned in grooves in said power transmitting members which grooves face toward each other and have the general shape of a cylindrical segment with an arc of not more than approximately 170°, and means detachably connecting said contact members to said respective assemblies of which they are a part.

4. A universal joint comprising rotatable assemblies supportable in driving relationship, said assemblies comprising shaft-like members having intermeshing power transmitting members projecting from adjacent ends thereof in fixed outwardly diverging acute angular relationship with reference to the axes of rotation of said respective assemblies of which they are a part, each of said power transmitting members having the general shape of an isosceles spherical triangle pyramid of a thick-walled hollow sphere connected at one vertex to said shaft-like member of the respective assemblies of which it is a part thereby providing clearance underneath their projecting ends to permit substantial angular movement of said assemblies relative to each other, cooperating pairs of semi-cylindrical contact members carried by said power transmitting members with their flat surfaces in continuous sliding engagement with each other and oscillatably supported in fixed outwardly diverging angular relationship with reference to the axis of rotation of said respective assemblies of which they form a part at an angle in the order of 25° to 50° by being positioned in grooves in said power transmitting members which grooves face toward each other and have the general shape of a cylindrical segment with an arc of not more than approximately 170°, and sleeve-like bearing members in said grooves underneath said contact members, and means detachably connecting said contact members and said bearing members to said respective assemblies of which they are a part.

5. A universal joint comprising rotatable assemblies supportable in driving relationship, said assemblies comprising shaft-like members having symmetrically-arranged intermeshing power transmitting members projecting from adjacent ends thereof in fixed outwardly diverging acute angular relationship with reference to the respective axes of rotation of the assemblies of which they are a part, each of said power transmitting members having the general shape of an isosceles spherical triangle pyramid of a thick-walled hollow sphere connected at one vertex to said shaft-like member of the respective assemblies of which it is a part thereby providing clearance underneath their projecting ends to permit substantial angular movement of said assemblies relative to each other, said power transmitting members comprising side surfaces diverging outwardly with respect to each other and provided with grooves having the general shape of a cylindrical segment with an arc of not more than approximately 170°, said grooves having their longitudinal axes at an angle of approximately 25° to 50° to the axis of rotation of said respective assemblies in which they are formed, semi-cylindrical contact members oscillatably supported in said grooves, and means detachably connecting said contact members to said respective assemblies of which they are a part, said contact members connected to any one of said power transmitting members lying between and having their flat surfaces in continuous sliding engagement with corresponding and oppositely facing contact members of the other of said assemblies.

6. A universal joint comprising rotatable assemblies supportable in driving relationship, said assemblies comprising shaft-like members having symmetrically-arranged intermeshing power transmitting members projecting from adjacent ends thereof in fixed outwardly diverging acute angular relationship with reference to the respective axes of rotation of the assemblies of which they are a part each of said power transmitting members having the general shape of an isosceles spherical triangle pyramid of a thick walled hollow sphere connected at one vertex to said shaft-like member of the respective assemblies of which it is a part thereby providing clearance underneath their projecting ends to permit substantial angular movement of said assemblies relative to each other, said power transmitting members comprising side surfaces diverging outwardly with respect to each other and provided with grooves having the general shape of a cylindrical segment with an arc of not more than approximately 170°, said grooves having their longitudinal axes at an angle of approximately 25° to 50° to the axis of rotation of said respective assemblies in which they are formed, semi-cylindrical contact members oscillatably supported in said grooves, sleeve-like bearing members in said grooves underneath said contact members, and means detachably connecting said contact members and said bearing members in said respective assemblies of which they are a part, said contact members connected to any one of said power transmitting members lying between and having their flat surfaces in continuous sliding engagement with corresponding and oppositely facing contact members of the other of said assemblies.

WILLIAM F. SINDELAR.

REFERENCES CITED

The following references are of record in the file of this patent:

UNITED STATES PATENTS

| Number | Name | Date |
| --- | --- | --- |
| 1,372,444 | Mikaelson | Mar. 22, 1921 |
| 1,643,353 | Stiefel | Sept. 27, 1927 |
| 2,026,244 | Myard | Dec. 31, 1935 |
| 2,134,508 | Floyd | Oct. 25, 1938 |
| 2,239,202 | Rendleman | Apr. 22, 1941 |
| 2,250,653 | Safford | July 29, 1941 |
| 2,291,436 | Anderson | July 28, 1942 |
| 2,304,666 | Sturges | Dec. 8, 1942 |

FOREIGN PATENTS

| Number | Country | Date |
| --- | --- | --- |
| 12,697 | Great Britain | 1889 |